US008606515B2

(12) United States Patent
Freeman et al.

(10) Patent No.: US 8,606,515 B2
(45) Date of Patent: Dec. 10, 2013

(54) REAL TIME TRAVEL DIRECTOR

(71) Applicant: Intelligent Design Labs, L.L.C., Tulsa, OK (US)

(72) Inventors: Mitchael C. Freeman, Sapulpa, OK (US); Michael H. Freeman, Tulsa, OK (US)

(73) Assignee: Intelligent Design Labs, L.L.C., Tulsa, OK (US)

( * ) Notice: Subject to any disclaimer, the term of this patent is extended or adjusted under 35 U.S.C. 154(b) by 0 days.

(21) Appl. No.: 13/778,651

(22) Filed: Feb. 27, 2013

(65) Prior Publication Data

US 2013/0173151 A1 Jul. 4, 2013

Related U.S. Application Data

(63) Continuation of application No. 11/807,969, filed on May 31, 2007, now Pat. No. 8,437,954.

(60) Provisional application No. 60/803,806, filed on Jun. 2, 2006.

(51) Int. Cl.
*G01C 21/20* (2006.01)
*G01C 21/34* (2006.01)

(52) U.S. Cl.
CPC ............ *G01C 21/206* (2013.01); *G01C 21/343* (2013.01)
USPC ........................................................ 701/426

(58) Field of Classification Search
USPC .......................................................... 701/211
See application file for complete search history.

(56) References Cited

U.S. PATENT DOCUMENTS

| | | | | |
|---|---|---|---|---|
| 7,259,656 | B1 * | 8/2007 | Wright | 340/286.14 |
| 7,263,375 | B2 * | 8/2007 | Zavada et al. | 455/456.6 |
| 7,865,306 | B2 * | 1/2011 | Mays | 701/437 |
| 7,868,264 | B2 * | 1/2011 | Stemmle et al. | 209/584 |
| 2005/0242180 | A1 * | 11/2005 | Byford | 235/385 |
| 2006/0135183 | A1 * | 6/2006 | Zavada et al. | 455/457 |
| 2006/0290519 | A1 * | 12/2006 | Boate et al. | 340/573.4 |
| 2007/0067104 | A1 * | 3/2007 | Mays | 701/211 |
| 2007/0198174 | A1 * | 8/2007 | Williams et al. | 701/202 |
| 2007/0198175 | A1 * | 8/2007 | Williams et al. | 701/202 |
| 2008/0093273 | A1 * | 4/2008 | Stemmle | 209/584 |
| 2008/0093274 | A1 * | 4/2008 | Stemmle | 209/584 |
| 2009/0078618 | A1 * | 3/2009 | Stemmle et al. | 209/559 |

* cited by examiner

*Primary Examiner* — Shelley Chen
(74) *Attorney, Agent, or Firm* — Howard & Howard Attorneys PLLC

(57) ABSTRACT

A method for navigating through a predefined space is described herein. The method includes receiving, by a remote unit, a signal indicative of a selection of at least one destination category, wherein the selected destination category is associated with a plurality of destination locations. A position of each of the plurality of destination locations is determined within the predefined space. A final destination location is determined within the predefined space, an origination location of the remote unit is determined, and a first route is determined from the origination location to the final destination. The first route including each destination location included in the selected destination category.

44 Claims, 4 Drawing Sheets

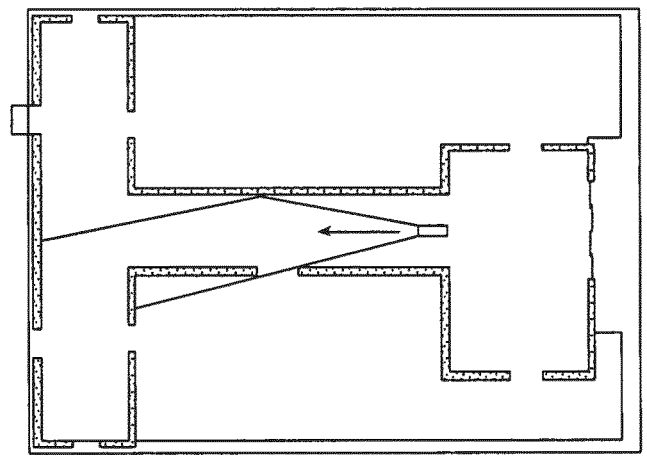
*Fig. 8*
 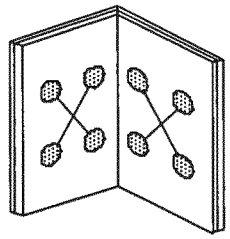 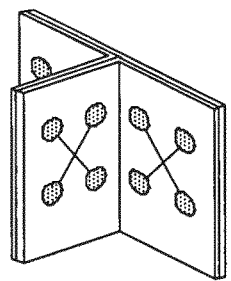
*Fig. 9*  *Fig. 10*  *Fig. 11*
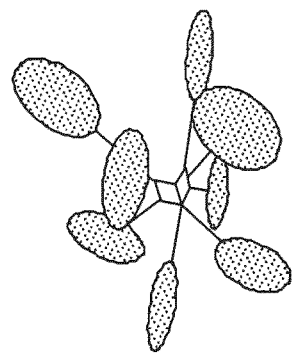 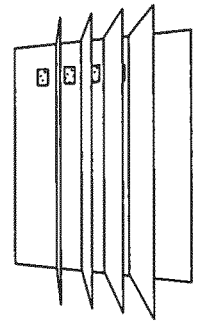
*Fig. 12*  *Fig. 13*

REAL TIME TRAVEL DIRECTOR

CROSS-REFERENCE TO RELATED APPLICATION

This application is a continuation of prior U.S. patent application Ser. No. 11/807,969 filed May 31, 2007, which claims priority to U.S. Provisional Application No. 60/803,806, filed Jun. 2, 2006, the disclosures of which is hereby incorporated by reference in their entirety.

BACKGROUND OF THE INVENTION

This invention relates generally to locator systems and more particularly concerns real time locators using signals which are not interrupted by line of sight obstacles.

There is a need in the art for a mobile building positioning system that can provide a user with exact directions to a specific location or locations input as one or more destinations; or provide a user's position within a building, or locate a specific items, place(s) or thing within a building and or facility. Current options exclude the economical or practical use of any system relying on the commonly used technology available from GPS because of the limitations of "line of sight" which is obstructed by the physical properties of a building. Other systems available now all have similar limitations. For instance, a "way-finding" system like is in use in many hospitals, consists of computer monitors/kiosks located at primary locations within the building which can be accessed by a user to print out a map from his location to a specific location programmed into the system. This system has inherent limitations in that the user must interpret the paper map with no 'on-going' dialog or input along the pathway as to correct or incorrect selections of turns or travel. Also, the user of this system must, on his/her own logic, determine the progression of any route and final destination without any further feedback or interaction from the way-finding system. This results in misinterpretations and errors by users causing a failure in the user's travel within a building to the desired location. Also, because there is no process for any feedback en-route, the user, many times, does not even know he has made a mistake until he fails to find the desired end location. This can be time consuming and provide frustration to a user who is likely unfamiliar with the actual routes available surrounding their current building and/or facility location. Systems like the "Way-Finder" systems relies heavily on the ability of the user to interpret the map correctly and identify on his own specific building visual cues. Global Position Systems are not usable within a building or facility due to the lack of "line-of-sight" to multiple satellite locations indoors. Radio-frequency triangulation ("RFT") systems also have limitations that are overcome by the invention. RFT's require major installation of wiring throughout a building, causing disruption and damage to walls, ceilings, floors, and other wired devices; and require fixed radio frequency transceivers which must be attached to walls and/or ceilings. These fixed monitors must operate based on a control system that take up value building and telecommunication space. RFT's also rely on the continuous 'beaming' of radio frequency throughout the building for use, whether needed at that moment or not. Also, coverage with RFT's rely on overlapping coverage areas, RTS's can leave gaps in coverage, and usually require that people be showered with RF on a constant basis. Current applications of RFID only contemplate the use of 'portal' technology, where the only information provided by a tag is whether or not a user or item has gone through a portal.

An inertial guidance system is practically cost prohibitive and must be calibrated frequently and even when correctly calibrated suffers from 'drift' complications, prohibiting precise locations and lacks feedback from actual building identifier locations.

With the establishment and advancements of such technology as RFID technology, unique locations within a building can be assigned an exact identifier that can be associated in a logical computer data base creating a grid pattern for the entire building that correlates to the actual physical properties of any building.

SUMMARY OF THE INVENTION

In accordance with the invention, there is provided a real time travel director including means and method (FPS) for the interactive mapping of a building or warehouse or other usable structure such that a user can access building co-ordinates via a mobile unit which can provide real time information about where the user (whether a human, robotic or vehicle ["HRV"]) is in a building and where a user needs to go for a pre-determined location and carrying along other information to present at the destination or any interim point.

A Remote Mobile Unit ("RMU") tracks the HRV user's progress towards the destination and provides a real time output in GUI interface, other visual and audio to provide clues to the user for further progress along the route. For instance, the RMU compares a segment of the linearly placed ID tags with themselves and/or other resident telemetric signatures to any device that is capable of receiving any telemetric frequencies (any frequency from the audio to infra-red spectrums) and identify the same. The second component is a unique identifies, such as an RFID "tag" chip or other unique telemetric frequency identifier that is either assigned or possesses a unique identifier within a building and/or facility. A third component is a computerized logic program contained in the receiver or base unit that provides a grid pattern of the identifiers that corresponds with specific locations within a building and/or facility. A fourth component is a data base unit that provides the unique tag with a position within a known or existing building structure. The building coordinates are established by associating logical coordinates with the identifiers. Each 'sweep' of the reader collects data and compares it to the data base within the mobile reader and/or data base unit and provides the user with his location. Or, the destination can be pre-established by user input to the Reader/base unit to provide an interactive map and direction finder to the user when activated on reads from the identifiers. The mobility aspect of the invention is such that as the receiver receives and evaluates the input data from the unique identifiers, it corresponds those unique positions within the fixed locations of the building according to its data base, and establishes the user's position either in transit, as a fixed position, or expressed as a route map as shown by a GUI interface on the receiver. The Receiver can also be programmed to create a route map to a specific devise, place or thing, that has been assigned a unique place in the building and has been assigned a unique identifier. The Receiver can have data from the base unit down loaded into it or can download information into the base unit. The logic can also be programmed by the receiver relative to the unique identifiers. Places and equipment can be established on the grid system, providing a user with a unique location for a specific item, place or piece of equipment, and establish a travel route to that item, place or thing. The System can also prioritize methods and manners of travel to efficiently and effectively provide a HVR User with a preferred trip order, preferred trip ending, preferred interim stops, or preferred prioritized stops first then other less priority stops later, to name a few. The HVR user can also prioritize for on end destination, several interim destinations, or prioritize the interim stops along the way and even plan according to a timing mechanism which will put the HVR User at certain stops at specific times. The System can also be programmed to provide a read-out to avoid certain places and verify when each final and/or interim destination has been reached both to an end user and to a master data base.

The System can use either passive or active RFID tags and use either low frequency, high frequency ("near field") and/or ultra high frequencies ("far field").

In an upgrade, the FMPS can be programmed to include electronic documentation that is instantly downloaded when a specific destination is reached, or be programmed with electronic 'credits' that instantly credit an account when an interim and/or final destination is reached. For instance, in a hospital application, where a patient is traversing the hospital to take various medical tests, the FMPS can be programmed with the insurance data of a person using the FMPS which is downloadable automatically when the person arrives at a specific location at a hospital; or the information that would be downloaded could include the patient name and number of a patient and other patient account and medical records reference, such that when the patient holding a RMU reaches the desired location for a test, it is programmed to prompt a existing receptor program at that testing site where the RMU sends an indicator alerting a patient staging program on the receptor program, thus, sending the patient's name and number and accounting formation and other information, prompting the hospital personnel to know that the patient has appeared for whatever test is necessary at that location and having the RMU prompt the information in their resident data bank for use and application.

In one embodiment, a method for navigating through a predefined space is provided. The method includes receiving, by a remote unit, a signal indicative of a selection of at least one destination category, wherein the selected destination category is associated with a plurality of destination locations. A position of each of the plurality of destination locations is determined within the predefined space. A final destination location is determined within the predefined space, an origination location of the remote unit is determined, and a first route is determined from the origination location to the final destination. The first route including each destination location included in the selected destination category.

In another embodiment, a system for use in navigating through a predefined space is provided. The system includes a plurality of signature signal sources located in respective predetermined positions within the predefined space, and a remote unit that is adapted to be coupled to a vehicle. The remote unit includes a controller for receiving a signal indicative of a selection of at least one destination category. The selected destination category is associated with a plurality of destination locations, wherein each destination location of the plurality of destination locations associated with a corresponding signature signal source. The controller determines a position of each of the plurality of destination locations within the predefined space. The controller also determines a final destination location within the predefined space, determines an origination location of the remote unit, and determines a first route from the origination location to the final destination, wherein the first route including each destination location included in the selected destination category.

In yet another embodiment, one or more computer-readable storage media having computer executable instructions thereon is provided. The computer executable instructions, wherein when executed by at least one processor, cause the processor to receive a user selection of at least one destination category, wherein the selected destination category is associated with a plurality of destination locations, and determine a position of each of the plurality of destination locations within the predefined space. The processor also determines a final destination location within the predefined space, determines an origination location of the remote unit, and determines a first route from the origination location to the final destination, wherein the first route including each destination location included in the selected destination category.

BRIEF DESCRIPTION OF THE DRAWINGS

Other objects and advantages of the invention will become apparent upon reading the following detailed description and upon reference to the drawings in which:

FIG. 8 is a perspective view illustrating the use of the real time travel director by a robotic unit in a passageway of the environment;

FIG. 9 is a graphic representation of an RFID tag;

FIG. 10 is an illustration of a use of multiple tags of FIG. 9 on a first substrate;

FIG. 11 is an illustration of a use of multiple tags of FIG. 9 on a second substrate;

FIG. 12 is an illustration of a use of multiple tags of FIG. 9 oriented at multiple angles; and FIG. 13 is an illustration of a use of multiple tags of FIG. 9 on a third substrate.

While the invention will be described in connection with preferred embodiments thereof, it will be understood that it is not intended to limit the invention to those embodiments or to the details of the construction or arrangement of parts illustrated in the accompanying drawings.

DETAILED DESCRIPTION OF THE INVENTION

A description of the Mobile Facility Destination/Location System with a prioritization and optimization selection feature follows.

Figure 1:
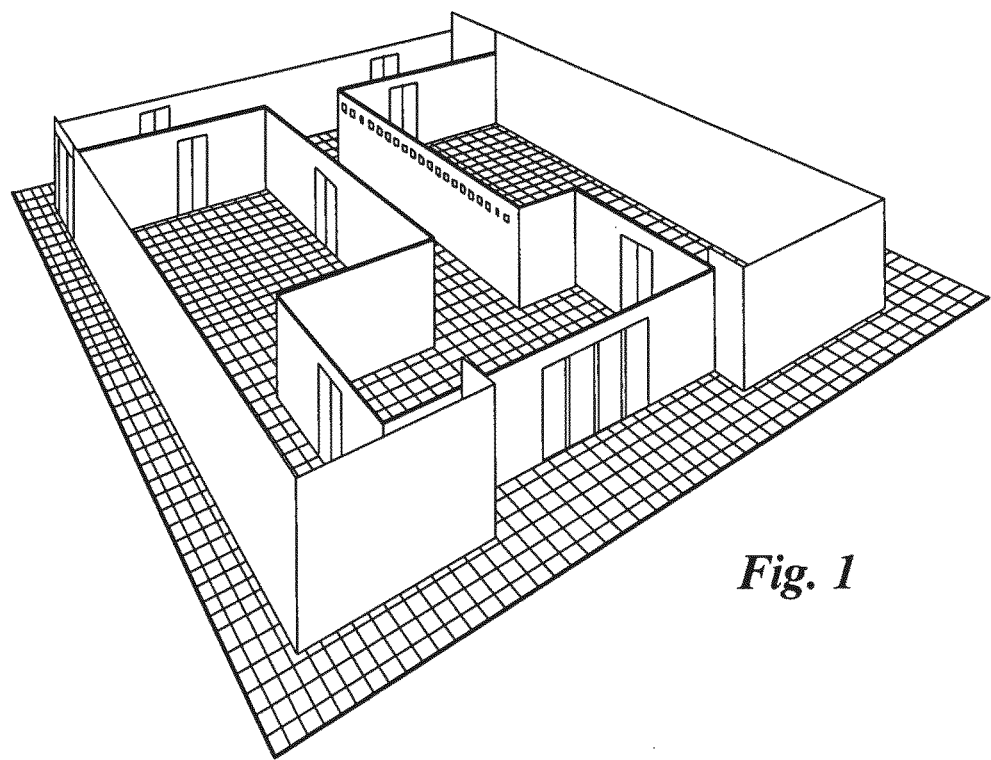
FIG. 1 is a perspective view of an environment, such as a hospital floor, in which the real time travel director may be used.

The Mobile Facility Destination/Location System ("FDLS") is a new product/system/invention for 'real-time' directing of human/robotic/vehicular ("HRV") travel via a handheld remote mobile unit ("RMU") device that displays 'real time' directions for finding a destination or series of destinations within a defined space like a building or facility or other physical property. For the purposes of this description, it is contemplated that a building such as a hospital is used as an example. (See, FIG. 1, a depiction of a floor within a building). However, under the teachings of this invention the invention could also be used in other physical properties like a large aircraft, train or submarine, which cannot otherwise obtain static signals such as GPS positioning.

Figure 2:
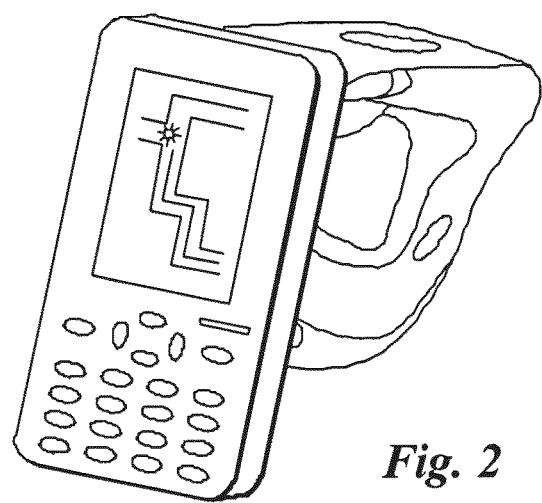
FIG. 2 is a perspective view of the real time travel director illustrating its operation in a passageway of the environment.

The FDLS can also locate and direct travel to specific coordinates, people, places, and/or components and equipment within a facility. (See, FIG. 2).

Figure 3:
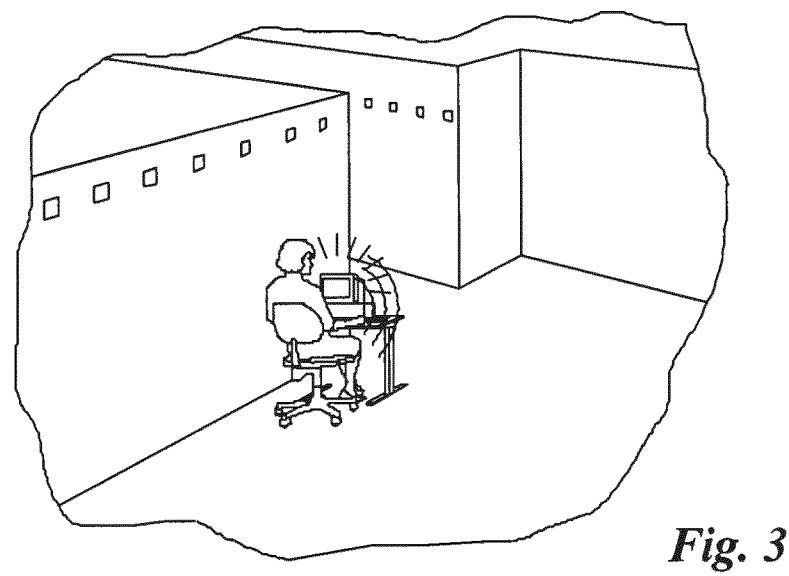
FIG. 3 is a perspective view of the real time travel director utilizing processor bandwidth of another computer via wireless connection.

By the teaching of the invention method disclosed herein, the FDLS creates a complete virtual signature of an existing physical building/structure and defines coordinates on a virtual grid within the RMU by comparing the linear range from a set of unique segments programmed on multiple sequenced identifier tags ("ID's" or "ID tags") programmed on strategically placed ID's, such as active and/or passive RFID (Radio Frequency Identification) tags/chips, or by identifying existing telemetric signals pre-existing in a building/facility. (See, FIG. 3).

The system operates by comparing the linear interrogations with other unique signatures from other RFID tags or from other existing radio frequency (RF) signals or any other telemetric signatures available within the facility. In one embodiment, to create the virtual space, the FDLS RMU first programs the ID tags according to a spacial and/or descriptive attributes or other categorical attributes or identifiers thereof in order to make available spontaneous relational sequencing and ordering from the ID tags. In this embodiment, the mobile FDLS device, in user 'origination' mode, upon receiving a 'start' instruction reads available signatures from ID tags and develops them into a virtual space capable of configuring a logical progression of path segments, based on relative spacing of objects and virtual objects, for a visual/audio read out on the FDLS RMU. This is done for such a purposes as providing to the HRV user various logical path segments leading to a final desired and input destination which defines one or more specific methods of actual physical travel within a building/facility avoiding obstacles to travel. The FDLS System determines from the virtual grid locations correlation to actual places in a facility to achieve one or more actual possible physical methods of travel, along path segments, within the defined space of a building or a facility or other physical property.

In one use, an HRV makes an inquiry about a destination, and then the logical computer system within the FDLS RMU inventories options from its virtual ID tags data base and creates a route, expressed in one or more directional path segments that ultimately link a complete path together which leads the HRV User from one specific point in a facility to a final destination. (See, FIG. 2). In another use, the HRV User makes an 'optimized travel request' ("OTR") based prioritization of categorical attributes. Optimized travel requests are expressed as categories of equipment, like HVAC units, electrical boxes, plumbing and the like. Another way to create OTR's is to create categories of priority items such as travel by a doctor having an emergency room as a priority or OTR.

Figure 4:
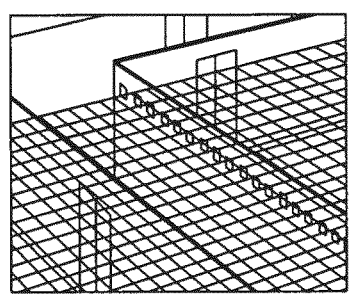
FIG. 4 is a perspective view illustrating the environment with a virtual grid superimposed.

The FDLS System can be programmed to provide grid resolution to very exacting locations (within a few inches) or general locations (within a few feet) as desired. Grid resolution is a factor of the number of actual/virtual ID tags and their corresponding inputs into the FDLS System, which affects costs and can be scaled up and down for higher or lower resolution. (See FIG. 4).

The initial query about a destination, route or circuit of travel can be input into the RMU through the process of virtual identification described below, or the RMU can use available technology such as "bar codes" to read from a pre-programmed list, whereby the human user does not need to know where any particular item is, but can scan these selections as input to the RMU via a electronic or hard-copy "index" or "list". For instance, if an HVAC employee needed to inspect all or a specific air conditioner within a building, he could scan the bar code of one or more HVAC's types from a document or electronic list maintained by the facility, which, then the RMU would configure to determine a route of travel within the building to visit one or more locations as input. Or, the HVAC employee could chose the "category" of "HVAC" from the resident index on the RMU, which would then produce a method of travel, to be displayed in a 'en-route' fashion, to the employee to travel to all such HVAC units. Likewise, another type of technician, such as a plumber could input or scan in one or more specific plumbing chases and the RMU would develop path segments to sequence a single route or a circuit to be traveled to visit all desired locations. Also, a person needing to 're-certify' or 're-inspect' equipment, such as medical equipment could use the same method of the RMU to identify a circuit and route for travel to all such items as chosen from the category list.

In an alternative embodiment, a category of persons, places or things can be selected by the HRV user and the RMU would provide path segments towards travel to each item. Thus, the functioning of the RMU would permit selection by category of type of equipment or person, or place to visit and evaluate these items against the requested travel within an assumed or programmed in time or other categorical factor, such as unavailability of travel due to remodeling and/or construction.

In an alternate embodiment, a person, such as a maintenance technician could query the RMU via voice actuated command, saying, for instance, "electrical closets, south annex" whereupon the RMU would compute the necessary path segments to accomplish travel circuits and/or routes to all electrical closets in that annex of the facility. In this fashion also, the RMU's output can be optimized by time, importance, and/or according to maintenance schedule (or other category) to be followed visually and/or audibly to the destination on the RMU. Instead of voice, the RMU could be queried by any other means of selection of category according to the teachings of the present invention.

Figure 5:
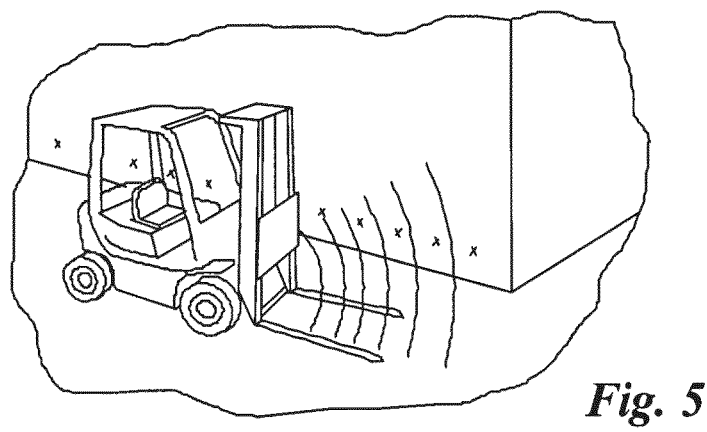
FIG. 5 is a perspective view illustrating the use of the real time travel director on a vehicle, such as a fork lift, the data received by the director and the source tags in the environment.

When activated, the FDLS RMU, whether hand-held or mounted on a vehicle like a forklift, (shown below) continually polls ID tags to determine current relative position of the HRV user and all other input, via the readable ID tags, both in its virtual data base and as affixed and/or existing in a building. (See, FIG. 5). During this process, the RMU inputs this information into the virtual system which then updates the travel of the HRV User along one or more of the defined path segments within the confines of the categories and/or priorities assigned by the HRV User or as assumed by the RMU.

The FDLS RMU indicates a HRV User's progress and the success or failure of the HRV User in traveling along the defined path segments and in arriving at the pre-determined destination(s) or circuits. The FDLS RMU logic system is 'en-route' programmable permitting the introduction of alternate or new destinations during any path segment. The FDLS RMU also provides an interactive/directional map and/or guide and querying functions for initial input or for intermediate input along the defined path segments or expressed as initial or sequential alternatives (two or more methods of travel that the HRV User can select from). The FDLS RMU also permits the prioritizing of travel or stops or categories of items to be included in the desired destination(s) along the way. For instance, if a maintenance worker needed the most preferred method of travel to inspect several facility closets, the FDLS System would project the best method of travel to achieve stops at each desired location Likewise, if a physician needed to makes numerous 'rounds' to see patients in rooms within a facility such as a Hospital, the FDLS System would give one or more preferred paths segments expressed as a complete circuit that would include stops at each desired location. In this fashion the HRV User can either select to return to his point of origination or exit the facility at another point selected after the desired travel. Also, the FDLS can be programmed to provide that same physician with travel for "priority" stops, for instance, a doctor could use the FDLS System to program his desired route within a hospital based on travel to the most critical patients first. Also, a human HRV User like a patient arriving at a hospital facility for numerous tests could use the FDLS System for finding his/her way to various labs at specific times, as the RMU provides sequencing for time values and provides an alarm queue for beginning the next segment within a complete circuit including a 'timing feature' that would arrange travel to meet pre-specified times. In this fashion the patient HRV User would find the FDLS System useful to find their way in a hospital from the entry point to one specific destination or multiple destinations.

Figure 6:
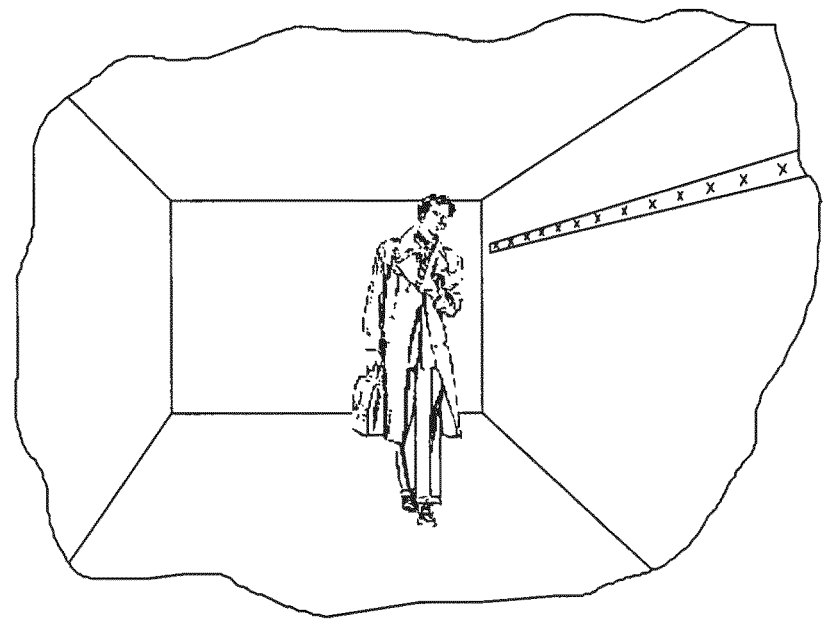
FIG. 6 is a perspective view illustrating the use of the real time travel director by a person in a passageway of the environment.
Figure 7:
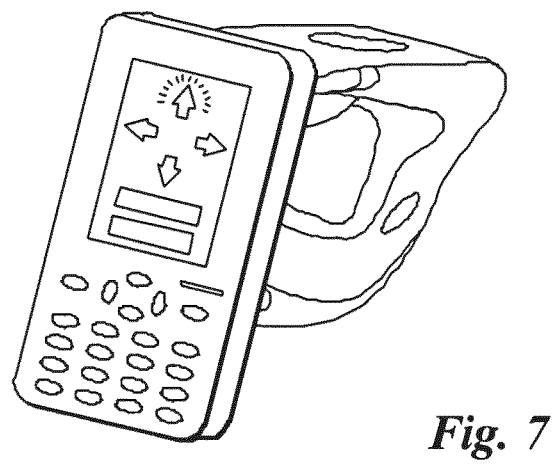
FIG. 7 is a perspective view of the real time travel director illustrating its operation in a multi-level environment.

The mobile FDLS reader/mobile unit ("RMU") once initiated by the HRV user continues to read automatically along the path actually traveled by the HRV user. (See, FIG. 6). I can contain patient coding information to 'ping' a receptor database when the desired destination is reached. Also, the FDLS RMU provides the HRV user with a one or both of visual and/or audio display providing cues as to direction of movement required to achieve each path segment along to the desired destination as well as cues as to intermittent progress along the path segment, via a 'progress bar' or other indicator showing the HRV's progress along the indicated paths, as well as an indicator showing degree of advancement towards the predetermined destination(s), and indicators to advise the user such cues as to either turn left, right, go forward, back up, and/or go up or down one or more levels. (See, FIG. 7).

As the HRV user travels with the mobile reader his origination location remains constant or the FDLS RMU can be reinitiated using any current location along the defined path. The FDLS RMU functions may also be integrated into or attached to existing mobile devices such as PDA and/or cell phone technologies. The FDLS RMU can also direct a similar path segments or circuits to provide directions to specific equipment, places and/or people recognized from unique ID tags resident within the logic virtual computer system.

Likewise, with the FDLS System a robotic could deliver medicines in a hospital based on the FDLS's ability to create from starting and intermittent stop inputs numerous path segments which would be necessary for a complete round; and the FDLS System would provide one or more routes for accomplishing such travel whether for one destination or along a circuit. (See, FIG. 8).

Also, a vehicle, such as a forklift or man-lift could use the FDLS Systems' mobility and destination finding capabilities in order to achieve intermediate stops towards a final destination, or a single destination. Several stops could be programmed into the FDLS System for this purpose, such as several stops to pick up desired inventory before arriving at a loading dock.

The FDLS invention can be programmed in its mobile unit to use currently existing RFID technology, by placing active and/or passive ID tags on a tape strip, doors, walls, ceilings, above ceilings, on or under floors, in or under carpets, within or manufactured as a part of molding or trim or wall coverings by affixing the ID tags by any known method of affixture of a small device to a surface/space. The ID tags once placed and programmed, either internally or as a signal recognized by the virtual logical system contained within the Mobile FDLS device, all relate to one another in the virtual logical computer system program to achieve coordinates from any set of ID tags and/or any other receivable telemetric frequency identified and defined within the physical space in order to decipher one unique position within a building and/or facility and chart and/or project a step by step path segments towards a defined destination within an actual physical building. The Mobile FDLS System uses the input from the ID tags to create real travel through a building/facility avoiding walls and other obstructions and providing travel through hallways, rooms, warehouses, elevators, stairs and other physical attributes of a building/facility that can accommodate HRV traffic.

The FDLS system includes one or more remote mobile units (RMU). (See, examples FIGS. 2 & 7). The RMU operates on a computer platform which is a hardwired and/or mobile/battery operated device capable of programming and/or receiving information such as radio frequency or any other telemetric information. The RMU can use the technology commonly known as mobile RFID transceivers (transmitter/receiver) [often called a "RFID Reader"] as an integral part. The RMU can be a 'dual function' unit that both reads and writes data information from and to ID tags such as passive or active RFID chips or can consist of two separate units, one for programming the ID tags and one for reading and FDLS functioning. (See, FIG. 9). The RMU reader may be as simple as a memory device with a single led light or a complete user friendly GUI interface. The RMU can use simple computing or interface into a grid computing systems that shares idle CPU cycles with other RMU's in the area. Or, the RMU may include and evaluate raster and/or vector information for GUI interface output to a HRV User. The RMU uses the input from the ID tags for completion of the analytical processes as identified above. The RMU reader uses the logical computer interface evaluation operations as identified above to achieve specific results for optimization, prioritization and/or category travel/destinations. The RMU can also operate on the input from a device such as a video camera, audio receiver and/or infra-red receiver which can interpret telemetric signals of original origin or from ID tags. The RMU has certain components including a system for graphical/audio/machine/robotic interface. The RMU has components for evaluating optimization results and output, for evaluating prioritization results and outputs, and for evaluating categorized information obtained from input from both the defined space environment and HRV User input.

The FDLS system includes ID Tags. ID tags can be a simple as either passive or active RFID tag or tag in combination with other tags or that tag in combination with other telemetric signals, or can be solely based upon original telemetric signals from any emitting/reflecting source readable and/or having a unique signal. (See, FIG. 8). An important new use and invention is the use of an ID tag which can also be a "vector tag" ("VTAG") which is capable of being read by the RMU such that its angle of incidence can be derived relative to the RMU. (See, FIGS. 10, 11 and 12 for examples). The VTAG consists of one or more ID tags placed by aligning multiple tags in close proximity with each other but with differing antennae orientation. (See, FIGS. 9, 10,11). Also, the VTAG can also be deployed to be used in combination with one or more ID tags that have shielding devices over their antenna permitting reception from one orientation, but prohibiting reception/reading from another orientation. One skilled in the art will recognize that this unique application for the VTAG's is pictured in another use by the louvers used on a stop light, which permit viewing from one orientation, but shield viewing from other orientations. (See, FIG. 13). In this fashion the FDLS logical computing system can use reads from the VTAG's to identify orientation and direction of travel as well as the progress/origination/destination of travel of a HRV User to provide its data output.

The FDLS system includes computer interfaces. One or more computer interfaces with middle ware and/or endware which interact with the RMU and/or the main database either along the way or at the beginning point and destination point(s) and any interim point. The FDLS 'reader' is loaded with an intelligent computer logic including user specific information that can 'ping' a receptor program upon arrival at any given point, either to announce arrival or provide other user information electronically, thus, avoiding the need for the user to carry hard copy papers from one location to another (or carry medical records). The FDLS 'reader' program also can operate, in one method, by means of a given protocol that first identifies a starting location and a desired destination from its virtual data base of ID tags and/or other telemetric tags and computes one or more physical path segments for a HRV user to travel along in a defined facility to achieve a real physical travel guide from the origination location to the destination or any number of intermediate positions in-between. The mobile FDLS can also be programmed to provide the most efficient path to one or more predetermined locations or the most efficient paths to series of locations. The FDLS System can also organize a series of destinations input according to a user's desired categories and/or prioritization of persons, places and/or things and it will provide optimized path segments to accomplish the travel within the facility according to established hierarchy protocol. This provides the ability to either design travel within a building and/or facility according to critical step-saving path segments, or according to places that have the most critical need for a visit by the HRV user.

The logic protocol can either use the correlations from actual physical locations in a facility compared with ID locations in the virtual database or the data for identifying the path segments can be derived as relative positions of ID's one from another. Each ID tag will contain information about the type of object it is attached to or represents, and other important categorical information and/or signals that are emitted from the ID tags. This information can be combined and used by the FDLS System to create optimized circuits for building maintenance or other destination objectives. While this invention is focused on a method for a user to find a path to a preset destination or destinations within a building, and will greatly assist the process of return on investment for timely maintenance of building components, many variations and modifications may be made to the described embodiment(s) of the invention without departing substantially from the spirit and principles of the invention. For example, an FDLS RMU could assist a shopper in finding the best method of travel through a large shopping center or store to achieve pre-set shopping goals.

Thus, it is apparent that there has been provided, in accordance with the invention, a real time travel director that fully satisfies the objects, aims and advantages set forth above. While the invention has been described in conjunction with several embodiments thereof, it is evident that many alternatives, modifications and variations will be apparent to those skilled in the art and in light of the foregoing description. Accordingly, it is intended to embrace all such alternatives modifications and variations as fall within the scope of the appended claims.

What is claimed is:

1. A method for navigating through a predefined space comprising the steps of:

receiving, by a remote unit, a signal indicative of a selection of at least one destination category of a plurality of destination categories, the at least one destination category being associated with a plurality of destination locations, wherein the destination category associated with each destination location is based on an intrinsic attribute of the destination location;

determining a position of each of the plurality of destination locations within the predefined space;

determining a final destination location within the predefined space;

determining an origination location of the remote unit; and determining a first route from the origination location to the final destination, the first route including each destination location included in the selected destination category.

2. A method in accordance with claim 1, further comprising the steps of:

receiving a plurality of signature signals from a plurality of signature signal sources, each signature signal of the plurality of signature signals being indicative of a location of an associated signature signal source; and determining a position of the remote unit within the predefined space based on the received plurality of signature signal sources.

3. A method in accordance with claim 2, further comprising the step of determining a progress of the remote unit along the first route based on the determined position of the remote unit.

4. A method in accordance with claim 2, further comprising the steps of:

determining if the position of the remote unit is along the first route; and responsively displaying a notification message if the remote unit has deviated from the first route.

5. A method in accordance with claim 4, further comprising the step of determining a second route from the remote unit position to the final destination location if the position of the remote unit has deviated from the first route.

6. A method in accordance with claim 1, further comprising the steps of:

determining at least one categorical attribute associated with the selected destination category; and optimizing the first route as a function of the at least one categorical attribute.

7. A method in accordance with claim 1, further comprising the steps of:

determining a priority between destination locations; and optimizing the first route as a function of the determined priority.

8. A method in accordance with claim 1, further comprising the steps of:

determining a planned period of time to travel the first route;

determining a position of the remote unit along the route; and determining an elapsed period of time from the origination location to the remote unit position.

9. A method in accordance with claim 8, further comprising the step of displaying a notification message if the elapsed time is different than the planned period of time.

10. A method in accordance with claim 8, further comprising the steps of:

determining the first route including a plurality of route segments, each route segment being defined between each destination location; and assigning a planned period of time of travel to each of the route segments.

11. A system for use in navigating through a predefined space, comprising:

a plurality of signature signal sources located in respective predetermined positions within the predefined space; and a remote unit adapted to be coupled to a vehicle, the remote unit including a controller for receiving a signal indicative of a selection of at least one destination category of a plurality of destination categories, the at least one destination category being associated with a plurality of destination locations, wherein the destination category associated with each destination location is based on an intrinsic attribute of the destination location, each destination location of the plurality of destination locations associated with a corresponding signature signal source, the controller for determining a position of each of the plurality of destination locations within the predefined space, for determining a final destination location within the predefined space, for determining an origination location of the remote unit, and for determining a first route from the origination location to the final destination, the first route including each destination location included in the selected destination category.

12. A system in accordance with claim 11, the controller for receiving a plurality of signature signals from each of the plurality of signature signal sources, wherein each signature signal of the plurality of signature signals being indicative of a location of an associated signature signal source, and for determining a position of the remote unit within the predefined space based on the received plurality of signature signal sources.

13. A system in accordance with claim 12, the controller for determining a progress of the remote unit along the first route based on the determined position of the remote unit.

14. A system in accordance with claim 12, the controller for determining if the position of the remote unit is along the first route, and for responsively displaying a notification message if the remote unit has deviated from the first route.

15. A system in accordance with claim 14, the controller for determining a second route from the determined remote unit position to the final destination location if the position of the remote unit has deviated from the first route.

16. A system in accordance with claim 11, the controller for determining at least one categorical attribute associated with the selected destination category, and for optimizing the first route as a function of the at least one categorical attribute.

17. A system in accordance with claim 11, the controller for determining a priority between destination locations, and for optimizing the first route as a function of the determined priority.

18. A system in accordance with claim 11, the controller for determining a planned period of time to travel the first route, for determining a position of the remote unit along the first route, and for determining an elapsed period of time from the origination location to the remote unit position.

19. A system in accordance with claim 18, the controller for displaying a notification message if the elapsed time is different than the planned period of time.

20. A system in accordance with claim 18, the controller for determining the first route including a plurality of route segments, each route segment being defined between each destination location, and for assigning a planned period of time of travel to each of the route segments.

21. One or more computer-readable storage media having computer executable instructions thereon, wherein when executed by at least one processor, the computer-executable instructions cause the at least one processor to:

receive a user selection of at least one destination category of a plurality of destination categories, the at least one destination category being associated with a plurality of destination locations, wherein the destination category associated with each destination location is based on an intrinsic attribute of the destination location;

determine a position of each of the plurality of destination locations within a predefined space;

determine a final destination location within the predefined space;

determine an origination location of the remote unit; and determine a first route from the origination location to the final destination, the first route including each destination location included in the selected destination category.

22. The one or more computer-readable storage media according to claim 21, wherein when executed by at least one processor, the computer-executable instructions cause the at least one processor to:

receive a plurality of signature signals from a plurality of signature signal sources, each signature signal of the plurality of signature signals being indicative of a location of an associated signature signal source; and determine a position of the remote unit within the predefined space based on the received plurality of signature signal sources.

23. The one or more computer-readable storage media according to claim 22, wherein when executed by at least one processor, the computer-executable instructions cause the at least one processor to:

determine if the position of the remote unit is along the first route; and determine a second route from the remote unit position to the final destination location if the position of the remote unit has deviated from the first route.

24. The one or more computer-readable storage media according to claim 21, wherein when executed by at least one processor, the computer-executable instructions cause the at least one processor to:

determine a priority between destination locations; and optimize the first route as a function of the determined priority.

25. The one or more computer-readable storage media according to claim 21, wherein when executed by at least one processor, the computer-executable instructions cause the at least one processor to:

determine a planned period of time to travel the first route;

determine a position of the remote unit along the first route; and determine an elapsed period of time from the origination location to the determined remote unit position.

26. A method in accordance with claim 1, wherein the intrinsic attribute of the destination location includes at least one of persons, places, components, and equipment located within the predefined space.

27. A method in accordance with claim 1, wherein the predefined space is one of a hospital, a store, a building, a property, a structure, and a warehouse.

28. A method in accordance with claim 1, wherein the predefined space is a hospital, at least one destination category of the plurality of destination categories includes one of a hospital patients associated with a doctor and treatments associated with a patient.

29. A method in accordance with claim 1, wherein the plurality of destination categories includes at least one of equipment, HVAC units, electrical boxes, and plumbing located within the predefined space.

30. A method in accordance with claim 1, wherein the predefined space includes one of a shopping center and a grocery store, the selected destination category including a prioritized list of shopping items associated with a shopper, the method comprising the step of optimizing the first route as a function of the prioritized list of shopping items to assist the shopper in traveling through the predefined space.

31. A method in accordance with claim 1, wherein the remote unit is adapted to be coupled to at least one of a robotic and a vehicle.

32. A method in accordance with claim 1, wherein the remote unit includes at least one of a PDA and a cell phone.

33. A system in accordance with claim 11, wherein the intrinsic attribute of the destination location includes at least one of persons, places, components, and equipment located within the predefined space.

34. A system in accordance with claim 11, wherein the predefined space is one of a hospital, a store, a building, a property, a structure, and a warehouse.

35. A system in accordance with claim 11, wherein the predefined space is a hospital, at least one destination category of the plurality of destination categories includes one of a hospital patients associated with a doctor and treatments associated with a patient.

36. A system in accordance with claim 11, wherein the plurality of destination categories includes at least one of equipment, HVAC units, electrical boxes, and plumbing located within the predefined space.

37. A system in accordance with claim 11, wherein the predefined space includes one of a shopping center and a grocery store, the selected destination category including a prioritized list of shopping items associated with a shopper, the controller configured to optimize the first route as a function of the prioritized list of shopping items to assist the shopper in traveling through the predefined space.

38. A system in accordance with claim 11, wherein the remote unit is adapted to be coupled to at least one of a robotic and a vehicle.

39. A system in accordance with claim 11, wherein the remote unit includes at least one of a PDA and a cell phone.

40. The one or more computer-readable storage media according to claim 21, wherein the intrinsic attribute of the destination location includes at least one of persons, places, components, and equipment located within the predefined space.

41. The one or more computer-readable storage media according to claim 21, wherein the predefined space is one of a hospital, a store, a building, a property, a structure, and a warehouse.

42. The one or more computer-readable storage media according to claim 21, wherein the predefined space is a hospital, at least one destination category of the plurality of destination categories includes one of a hospital patients associated with a doctor and treatments associated with a patient.

43. The one or more computer-readable storage media according to claim 21, wherein the plurality of destination categories includes at least one of equipment, HVAC units, electrical boxes, and plumbing located within the predefined space.

44. The one or more computer-readable storage media according to claim 21, wherein the predefined space includes one of a shopping center and a grocery store, the selected destination category including a prioritized list of shopping items associated with a shopper, the computer-executable instructions cause the at least one processor to optimize the first route as a function of the prioritized list of shopping items to assist the shopper in traveling through the predefined space.

* * * * *